(12) United States Patent
Gupta et al.

(10) Patent No.: US 10,598,500 B2
(45) Date of Patent: Mar. 24, 2020

(54) SEAMLESS HANDOVER OF ONGOING ACTIVITIES BETWEEN A VEHICLE AND A WEARABLE DEVICE

(71) Applicant: DAIMLER AG, Stuttgart (DE)

(72) Inventors: Sameer Gupta, Rochester, MI (US); Rigel Smiroldo, San Jose, CA (US); Thomas Winkler, Portola Valley, CA (US)

(73) Assignee: DAIMLER AG, Stuttgart (DE)

( * ) Notice: Subject to any disclaimer, the term of this patent is extended or adjusted under 35 U.S.C. 154(b) by 277 days.

(21) Appl. No.: 15/564,839

(22) PCT Filed: Mar. 5, 2016

(86) PCT No.: PCT/EP2016/000394
§ 371 (c)(1),
(2) Date: Oct. 6, 2017

(87) PCT Pub. No.: WO2016/162103
PCT Pub. Date: Oct. 13, 2016

(65) Prior Publication Data
US 2018/0106627 A1 Apr. 19, 2018

Related U.S. Application Data

(60) Provisional application No. 62/145,172, filed on Apr. 9, 2015.

(51) Int. Cl.
*G01C 21/34* (2006.01)
*G01C 21/36* (2006.01)
(Continued)

(52) U.S. Cl.
CPC ......... *G01C 21/3423* (2013.01); *G01C 21/20* (2013.01); *G01C 21/3617* (2013.01);
(Continued)

(58) Field of Classification Search
CPC ............... G01C 21/3423; G01C 21/20; G01C 21/3617; H04W 4/80; H04W 4/024; H04W 4/48; H04W 76/10; H04W 4/70
(Continued)

(56) References Cited

U.S. PATENT DOCUMENTS 6,505,121 B1 1/2003 Russell
2011/0018759 A1 1/2011 Bennett et al.
(Continued)

OTHER PUBLICATIONS

Elhoushi et al., "Robust Motion Mode Recognition for Portable Navigation Independent on Device Usage," 2014 IEEE/ION Position, Location and Navigation Symposium—PLANS 2014, May 5, 2014, pp. 158-163.
(Continued)

*Primary Examiner* — Brian P Sweeney
(74) *Attorney, Agent, or Firm* — Patent Portfolio Builders PLLC

(57) ABSTRACT

Systems and methods for handover of activities between a vehicle and a wearable device involve pairing the wearable device and a vehicle device with a wireless telephone. The proximity of the wearable device and the intention of a wearer of the device are determined and used to transfer information between the wireless telephone and the wearable device and/or the vehicle device in a seamless manner. Depending upon whether the wearer is in the vehicle or outside of the vehicle an activity, such as navigation, will be performed either by the vehicle device or the wearable device.

14 Claims, 5 Drawing Sheets

(51) Int. Cl.
  *G01C 21/20* (2006.01)
  *H04W 4/024* (2018.01)
  *H04W 4/48* (2018.01)
  *H04W 4/80* (2018.01)
  *H04W 76/10* (2018.01)

(52) U.S. Cl.
  CPC ............ *H04W 4/024* (2018.02); *H04W 4/48* (2018.02); *H04W 4/80* (2018.02); *H04W 76/10* (2018.02)

(58) Field of Classification Search
  USPC ........................................................ 701/521
  See application file for complete search history.

(56) References Cited

U.S. PATENT DOCUMENTS

2014/0375477 A1   12/2014  Jain et al.
2016/0061613 A1*   3/2016  Jung ................. G01C 21/3632
                                                                         701/49

OTHER PUBLICATIONS

International Search Report and Written Opinion dated May 24, 2016 in related International Application No. PCT/EP2016/000394.

\* cited by examiner

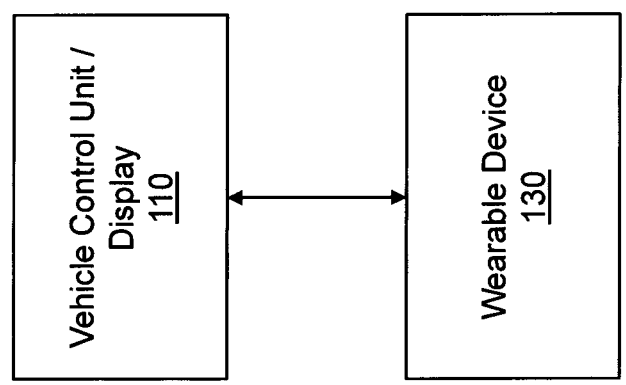

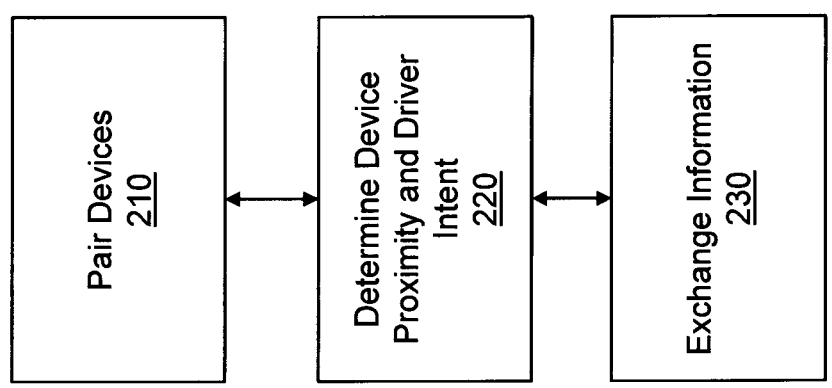

SEAMLESS HANDOVER OF ONGOING ACTIVITIES BETWEEN A VEHICLE AND A WEARABLE DEVICE

BACKGROUND OF THE INVENTION

Exemplary embodiments of the present invention are directed to wearable devices, and in particular to transferring activities between wearable devices and vehicle components.

Although futurists have long envisioned a world with wearable devices, these devices have only recently been available to consumers on a widespread basis. To encourage adoption, these devices are designed to be as small as possible, which requires limited battery and processing power. Accordingly, these devices typically have limited functionality (e.g., activity trackers) or rely upon other devices to provide processing power (e.g., the Apple Watch™ is paired with an iPhone to provide much of its functionality).

SUMMARY OF THE INVENTION

Despite the widespread adoption of wireless communications between devices, the transfer of information is typically quite limited. For example, a person can stream audio navigation information from their wireless telephone to a vehicle using Bluetooth technology. In this situation only audio information is transferred from the wireless telephone to the vehicle, not the underlying navigation data. Accordingly, it would be desirable to provide a deeper integration between vehicle devices and external devices, particularly wearable devices.

Exemplary embodiments of the present invention are directed to providing such deeper integration. In one aspect of the present invention, continuity is provided between vehicle devices and wearable devices so that depending upon whether a person is in a vehicle or outside of the vehicle either the vehicle devices will provide the user interaction or the wearable device will. For example, a wearable device can provide walking directions to a person while the person is outside of his/her vehicle. When the person enters his/her vehicle information is transferred from the wearable device to the vehicle device, which then provides driving navigation guidance. When the user then exits the vehicle the final destination can be transferred from the vehicle device to the wearable device, which can then provide walking guidance to the final destination. The transfer between the wearable device and vehicle device can be a direct transfer or can use a wireless phone as an intermediary.

Other objects, advantages and novel features of the present invention will become apparent from the following detailed description of the invention when considered in conjunction with the accompanying drawings.

BRIEF DESCRIPTION OF THE DRAWINGS

FIGS. 1A and 1B are block diagrams of exemplary systems in accordance with the present invention;

FIG. 2 is a flow diagram of an exemplary method in accordance with the present invention.

DETAILED DESCRIPTION OF THE DRAWINGS

Figure 1A:
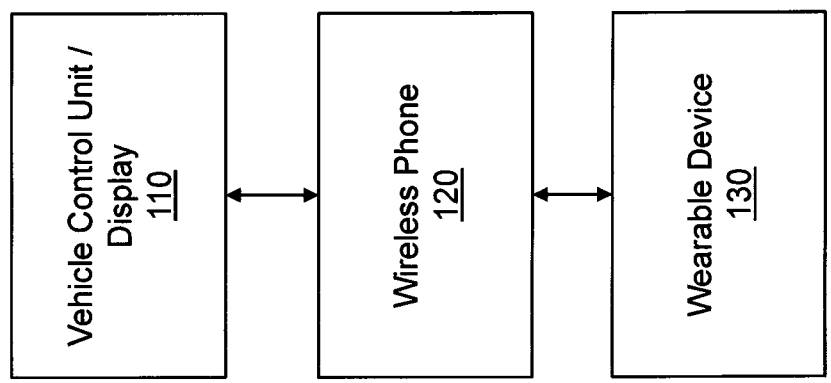

FIG. 1A is a block diagram of an exemplary system in accordance with the present invention. The system includes three basic components, a vehicle control unit/display 110, wireless phone 120, and wearable device 130. As illustrated, the wireless phone 120 acts as an intermediary between vehicle control unit/display 110 and wearable device 130, all of which communicate with each other using the illustrated communication links using wireless communications, such as WiFi, Bluetooth, Near-Field Communication (NFC), etc.

The vehicle control unit/display 110 can be what is conventionally referred to as a "head unit", which can provide entertainment (e.g., music, video, news, etc.) and navigation to passengers in the vehicle.

Wireless phone 120 can be any type of portable wireless device that has the ability to access a wide area wireless network (commonly referred to as a "cellular network"), as well as local area wireless networks (e.g., a WiFi, Bluetooth, or Near-Field Communication (NFC) network). Wireless phone 120 can be what is commonly referred to as a smartphone, meaning it has more than just basic telephonic capabilities. Further, wireless phone 120 need not actually have any telephonic capabilities and instead can be a data-only device.

Wearable device 130 can be any type of wearable device, such as a smart watch or smart glasses. Such devices typically have limited processing power due to their limited size, and thus typically rely upon another device, such as wireless phone 120, to provide the majority of the data processing and also for interacting with other devices.

As will be described in more detail below, devices 110-130 interact with each other in a manner to hand-off information to provide continuity to the user's experience. In the non-limiting application discussed below this involves the transfer of directions or guidance information between the wearable device 130 and vehicle control unit/display 110 depending upon whether the wearer of the device 130 is driving the vehicle or walking. The present invention, however, is not limited to this example and the invention can be applied to a variety of different contexts to provide continuity between activities performed within a vehicle and outside of the vehicle. The continuity involves the transfer of state information between the vehicle and personal devices (i.e., a wireless phone 120 and wearable device 130) and the transfer of control between the vehicle devices 110 and the personal devices depending upon the user's location (i.e., whether the user is inside or outside of the vehicle) and intentions (i.e., whether the user is entering or exiting the vehicle).

FIG. 1B illustrates another exemplary system of the present invention in which the wearable device 130 communicates directly with the vehicle control unit/display 110 of the vehicle. The operation of this system is similar to that of FIG. 1A except that the transfer of state information between wearable device 130 and vehicle control unit/display 110 occurs without wireless phone 120 acting as an intermediary between these two devices. The determination of the user's intent can be performed by either or both of the wearable device 130 and/or the vehicle control unit/display 110. In this embodiment the wearable device 130 can still communicate with a wireless phone 120 for other purposes. Thus, it should be appreciated that the present invention can be implemented with and without wireless phone 120 acting as an intermediary between wearable device 130 and vehicle control unit/display 110.

FIG. 2 is a flow diagram of an exemplary method in accordance with the present invention. The method has three basic steps, pairing of devices (step 210), determining device proximity to the vehicle and the driver's intent (step 220), and exchanging information to provide the continuity (step 230).

The pairing (step 210) establishes a relationship between a vehicle and one or more personal devices of the driver, which requires the system to be initially made aware of those relationships. In some scenarios a driver may be using multiple personal devices such as a wearable device 130 that is already paired to a wireless phone 120 since some wearable devices depend on a direct pairing with a wireless phone. In this case, special software running on the wireless phone 120 acts as an intermediary that communicates with both the vehicle and the wearable device 130.

There are multiple ways to establish a connection between a vehicle and a personal device, including (1) a direct wireless connection between devices and the vehicle; and (2) an indirect connection using the internet.

The direct wireless connection involves the user establishing a relationship between a vehicle and their device using a Bluetooth, WiFi, or Near-Field Communication (NFC) connection to the vehicle control unit/display 110 (i.e., the head unit). After a connection on the wireless level is established, the vehicle control unit 110 and the wireless phone 120 and wearable device 130 are able to detect their counterparts and establish a communication channel using a higher-level protocol (e.g. TCP- or UDP-based).

An indirect connection via the Internet requires that all involved devices (and the vehicle) are communicating with a backend server that keeps track of the relationship of these devices and forwards events accordingly. This can be achieved using one of two different methods.

In the first method the relationship can be established by having the user provide the same login credentials to each device (or vehicle). The device can then authenticate against the server with the provided credentials and the server can then keep track of which devices (vehicles) belong to the same user.

In the second method a relationship can also be established by using a manual approach where one device (e.g., the vehicle control unit/display 110) displays a unique ID (as a string or QR code), which has to be entered (or scanned in case of QR code) into the device that should be paired. The pairing can also be achieved using Near-Field Communication (NFC).

Once the devices are paired (step 210), the proximity of the wireless phone 120 and wearable device 130 to the vehicle and the driver's intent are determined (step 220) so that the system can exchange information about the current navigation state between devices and the vehicle.

For example, if turn-by-turn navigation is active on the vehicle control unit/display 110, the destination information has to be sent to the wireless phone 120 and wearable device 130 of the driver after the vehicle has been parked. Having received this information the wireless phone 120 and wearable device 130 can continue route guidance with walking direction until the destination is reached.

This requires the system to reliably detect cases where an activity has to move from the vehicle to the wireless phone 120 and wearable device 130 and vice versa, which can be accomplished using data from one or more of the following sensors is combined to reach a conclusion about the intent of the driver:

Plugging/unplugging of device
Ignition/Parking state of vehicle
Seat occupation sensors
Proximity sensors
Biometric sensors
User action In the simplest case, the ignition state is enough to decide if a trip starts/ends and responsibilities between devices can be handed over accordingly. Additional sensors can be used for more complex scenarios. For example, if multiple people are inside a vehicle and multiple devices are paired to the vehicle control unit/display 110, additional sensors can be used to figure out who is the driver.

Once it has been detected that a driver is entering or exiting the vehicle the current state of applications has to be transferred between paired devices.

For example, the user enters a destination into his/her wireless phone 120 or wearable device 130 while indoors. After leaving the house, the wireless phone 120 and wearable device 130 provide walking directions to the car. Once the user enters the car, walking directions are stopped and the destination information is seamlessly transferred to the vehicle control unit/display 110 (e.g., the vehicle's navigation system), which automatically starts providing driving directions.

This state information is packaged into a custom protocol that is understood by both the vehicle and the wireless phone 120 and wearable device 130. For this to work, both the vehicle control unit/display 110 as well as the wireless phone 120 and wearable device 130 need to run a proprietary software (or "App") that handles the communication between the involved parties.

Figure 3A:
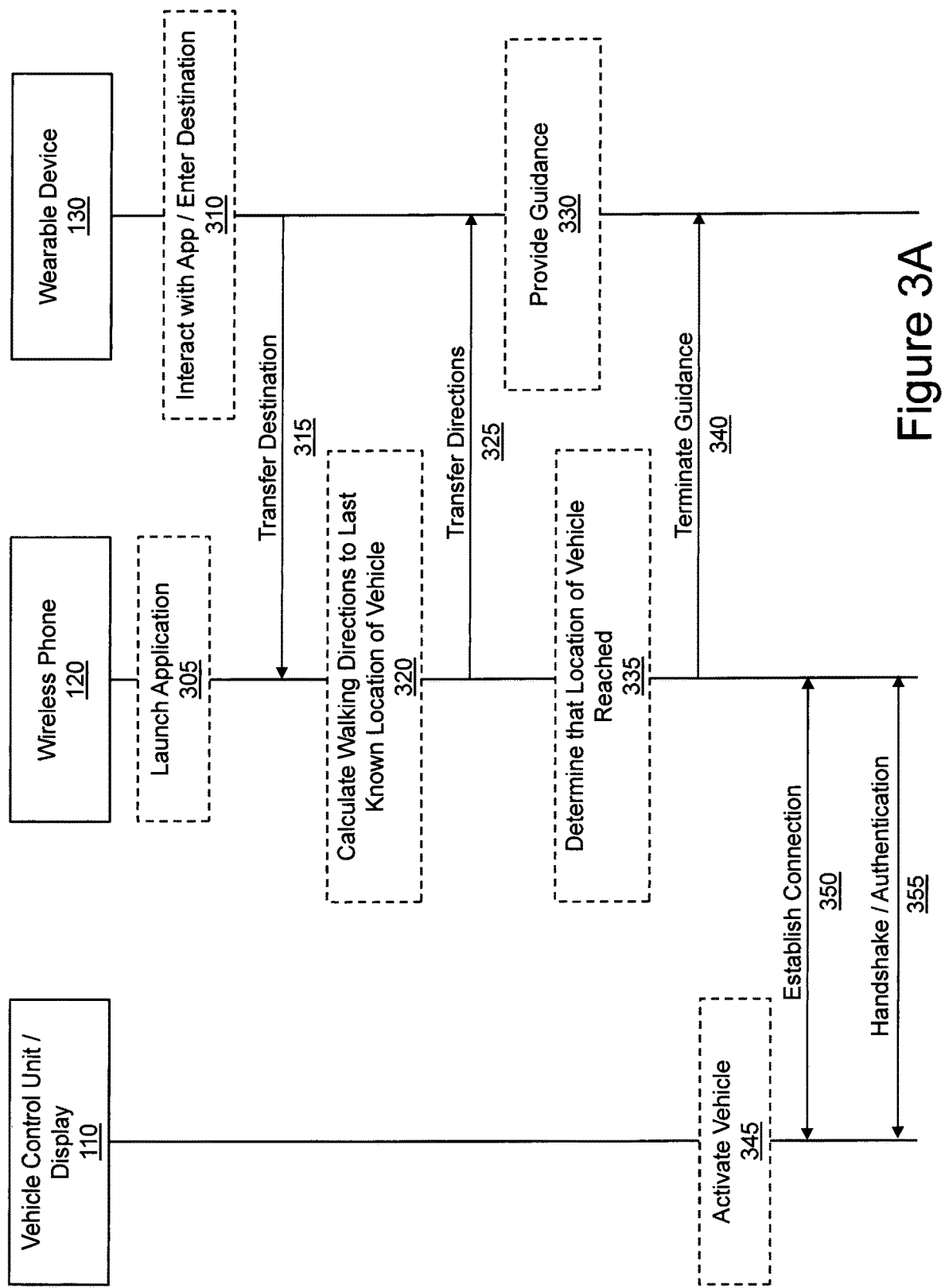
FIGS. 3A and 3B are diagrams of exemplary messaging between system components in accordance with the present invention.
Figure 3B:
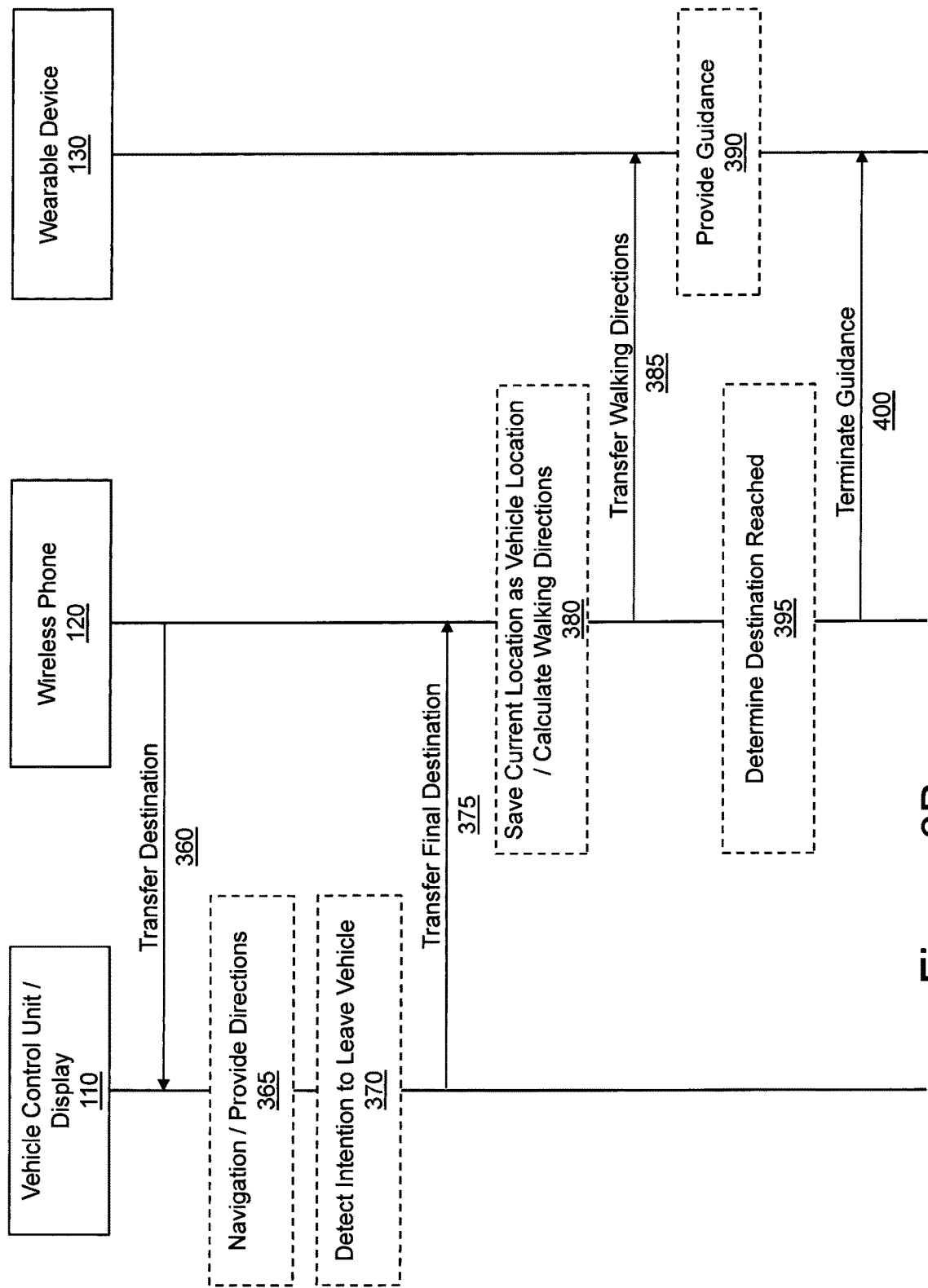

The navigation state information exchanged between the vehicle control unit/display 110 and a paired the wireless phone 120 and wearable device 130 can include, for example, current navigation destination (Latitude/Longitude or address string), and parked vehicle location Now that an overview of certain aspects of the invention has been provided, an exemplary use case will be described in connection with FIGS. 3A and 3B. This use case involves a user first being provided walking directions to a vehicle, then being provided with vehicle guidance, and finally guidance from a parking location of the vehicle to a final destination. Initially, the user launches an application on the wireless phone 120 (step 305). The user interacts with the application on the wearable device 130 to enter a destination (step 310), which is then transferred to the wireless phone 120 (step 315). The wireless phone 120 calculates the walking directions to the last known location of the vehicle (step 320) and transfers these directions to the wearable device 130 (step 325). The last known location of the vehicle can be previously stored by wireless phone 120 when the user last left the vehicle.

The wearable device 130 then provides guidance using directions provided from wireless phone 120 (step 330) until the wireless phone 120 determines that the location of the vehicle has been reached (step 335), at which time wireless phone 120 terminates sending guidance information to wearable device 130 (step 340). As an alternative to the wireless phone 120 providing ongoing guidance information to the wearable device 130, if the wearable device has the proper equipment (e.g., a GPS receiver and/or a step tracker) the wireless phone 120 can merely provide the destination information to the wearable device, which can then determine when the location of the vehicle has been reached.

Once the user has reached the vehicle and has activated it (step 345), a connection is established between the wireless phone 120 and vehicle control unit/display 110 (step 350) and the two devices perform a handshake and authentication procedure (step 355). Activating the vehicle can take any number of forms, including starting the vehicle and/or causing the vehicle to enter a state where it is supplied with electricity but the engine or fuel cell is not yet running. The wireless phone 120 then transfers the destination information to the vehicle control unit/display 110 (step 360). This transfer can be an address, longitude/latitude information, and/or any other type of information that allows identification of a geographic location of the destination. The vehicle control unit/display 110 then performs the conventional navigation procedure and provides directions to the driver (step 365) until it is determined that the driver intends to leave the vehicle (step 370). This determination can be performed using any of the data described above.

The vehicle control unit/display 110 then transfers the final destination to wireless phone 120 (step 375), which saves the current location as the vehicle location and calculates walking directions (step 380). By saving the current location the present invention allows the user to be guided back to the vehicle when the user desires to leave the destination. Wireless phone 120 then transfers the walking directions to wearable device 130 (step 385), which then provides guidance to the user (step 390). When the wireless phone 120 determines that the destination has been reached (step 395), then the guidance to the wearable device is terminated (step 400).

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method, comprising:
    inputting a destination into a wearable device;
    transferring, by the wearable device, the destination to a wireless phone that is paired with the wearable device;
    providing, by a wearable device, walking guidance to a vehicle;
    determining, by the wireless phone, that the wearable device has reached the vehicle;
    establishing a connection between the wireless phone and a device in the vehicle;
    transferring the destination from the wireless phone to the device in the vehicle over the established connection; and
    providing driving navigation guidance to the destination by the device in the vehicle.

2. The method of claim 1, further comprising:
    determining, by the device in the vehicle, that a wearer of the wearable device is intending to leave the vehicle and transferring a final destination to the wireless phone;
    calculating, by the wireless phone, walking guidance to the final destination; and
    providing, by the wearable device, walking guidance to the final destination.

3. The method of claim 2, wherein when the final destination is transferred to the wireless phone, the wireless phone determines and saves a current location as a location at which the vehicle is parked.

4. The method of claim 2, wherein the determination that the wearer of the wearable device is intending to leave the vehicle is based on unplugging of the wearable device, an ignition state of the vehicle, a parking state of the vehicle, a seat occupancy sensor, a proximity sensor, a biometric sensor, or action by the wearer of the wearable device.

5. The method of claim 1, further comprising:
    pairing the wearable device with the vehicle.

6. The method of claim 5, wherein the pairing is performed using a direct connection between the wearable device and the vehicle.

7. A method, comprising:
    inputting a destination into a wearable device;
    providing, by a wearable device, walking guidance to a vehicle;
    determining that the wearable device has reached the vehicle;
    establishing a connection between the wearable device and a device in the vehicle;
    transferring the destination from the wearable device to the device in the vehicle over the established connection; and
    providing driving navigation guidance to the destination by the device in the vehicle.

8. The method of claim 7, further comprising:
    determining, by the device in the vehicle, that a wearer of the wearable device is intending to leave the vehicle and transferring a final destination to the wearable device;
    calculating, by the wearable device, walking guidance to the final destination; and
    providing, by the wearable device, walking guidance to the final destination.

9. The method of claim 8, wherein when the final destination is transferred to the wearable device, the wearable device determines and saves a current location as a location at which the vehicle is parked.

10. The method of claim 8, wherein the determination that the wearer of the wearable device is intending to leave the vehicle is based on unplugging of the wearable device, an ignition state of the vehicle, a parking state of the vehicle, a seat occupancy sensor, a proximity sensor, a biometric sensor, or action by the wearer of the wearable device.

11. The method of claim 7, further comprising:
    pairing the wearable device with the vehicle.

12. The method of claim 11, wherein the pairing is performed using a direct connection between the wearable device and the vehicle.

13. The method of claim 11, wherein the pairing is performed using an indirect connection between the wearable device and the vehicle, the indirect connection involving the internet.

14. A method, comprising:
    inputting a destination into a wearable device;
    transferring, by the wearable device, the destination to a wireless phone that is paired with the wearable device;
    providing, by a wearable device, walking guidance to a vehicle;
    determining, by the wireless phone, that the wearable device has reached the vehicle;
    establishing a connection between the wireless phone and a device in the vehicle;
    transferring the destination from the wireless phone to the device in the vehicle over the established connection; and
providing driving navigation guidance to the destination by the device in the vehicle, wherein the method further comprises
    pairing the wearable device with the vehicle, wherein the pairing is performed using an indirect connection between the wearable device and the vehicle, the indirect connection involving the internet.

* * * * *